No. 621,120.  
J. C. MOORE.  
BICYCLE BRAKE.  
(Application filed Sept. 22, 1897.)
Patented Mar. 14, 1899.
(No Model.)
Fig. 1.
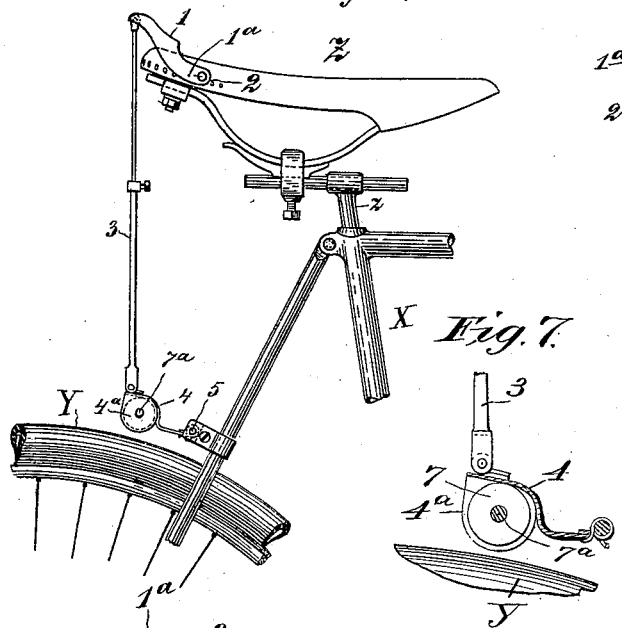
Fig. 2.
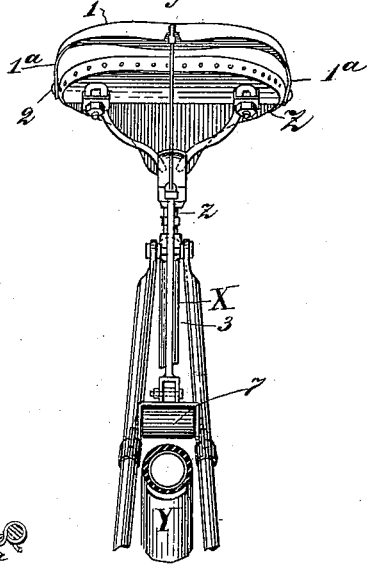
Fig. 3.
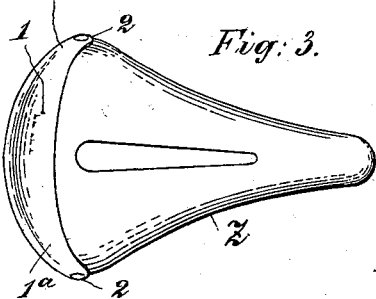
Fig. 7.
Fig. 4.
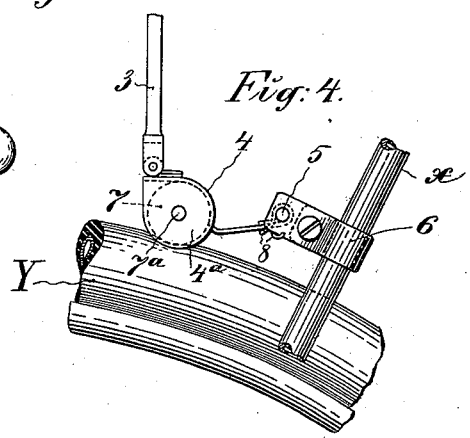
Fig. 5.
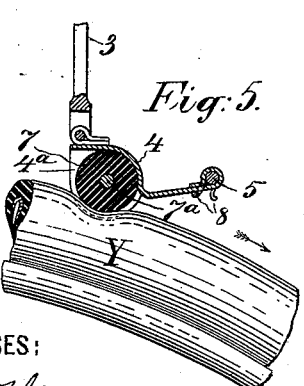
Fig. 6.
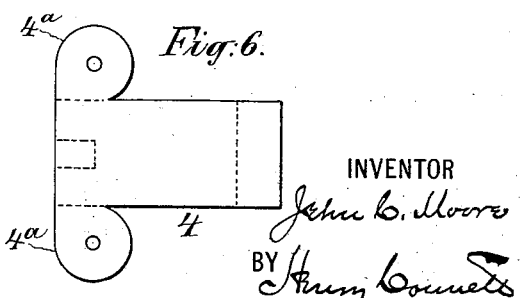
WITNESSES:  
J. H. Himan  
Peter N. Ross
INVENTOR  
John C. Moore  
BY Henry Connett  
ATTORNEY

UNITED STATES PATENT OFFICE.

JEHU C. MOORE, OF NEW YORK, N. Y.

BICYCLE-BRAKE.

SPECIFICATION forming part of Letters Patent No. 621,120, dated March 14, 1899.

Application filed September 22, 1897. Serial No. 652,559. (No model.)

*To all whom it may concern:*

Be it known that I, JEHU C. MOORE, a citizen of the United States, residing at New York, (Brooklyn,) Kings county, New York, have invented certain new and useful Improvements in Brakes for Velocipedes, of which the following is a specification.

This invention relates to the class of brakes suitable for bicycles, wherein the brake is applied to the rear wheel of the bicycle from the saddle by depression at the rear portion of the latter; and the object is, in part, to improve the operation of a rolling brake-pad, whereby a spring-strap is adapted to be brought more or less into frictional contact with the periphery of said roller by increasing or decreasing the brake-pressure, and, in part, to adapt the brake for use with the ordinary bicycle-saddle.

In the accompanying drawings, which illustrate an embodiment of the invention, Figure 1 is a side elevation of a part of a bicycle, showing my brake mounted thereon. Fig. 2 is a rear view of the same. Fig. 3 is a plan view of a saddle for a bicycle, showing the manner of mounting the hinged operating-plate thereon. Fig. 4 is a fragmentary detail view on a larger scale than Fig. 1, illustrating the application of the rolling pad to the tire of the wheel; and Fig. 5 is a sectional view illustrating the manner in which the strap embraces the rolling pad. Fig. 6 shows the blank from which the spring-strap is formed. Fig. 7 is a sectional elevation of the brake, showing the near end plate or cheek removed and illustrating the normal position of the spring 4 with respect to the pad.

Let X represent the frame of a bicycle, Y the tire of the rear wheel thereof, and Z a saddle secured in the usual way to the seat-post z. The saddle may be of any of the well-known kinds and will be fixed firmly to the seat-post. On the rear portion or cantle of the saddle is mounted the brake-operating plate 1, which may be curved, as seen in plan in Fig. 3, and have its extremities turned down to form hinging-lugs 1ª to receive screws or hinging-pins 2, set in the cantle of the saddle, at the respective sides of the latter.

To the free rear edge of the hinged plate 1 is coupled the upper extremity of a brake-rod 3, which may be made telescopic in a well-known way to permit of raising or lowering the saddle without disturbing the adjustment of the brake. At its lower end the rod 3 is coupled to the free end of a thin springy brake-pad carrier and strap 4, which is provided at its other end with suitable journals 5, which find bearings in clips 6 on the members x of the bicycle-frame.

In the carrier-strap 4 is rotatively mounted the rolling pad 7 of the brake. It is convenient to produce this carrier-strap 4 from a blank of substantially the form shown in Fig. 6 by bending down the parts 4ª to provide bearings for the journals 7ª of the rolling pad 7, these parts 4ª forming inclosing cheek-pieces which screen the ends of the pad from view and enhance the appearance of the brake. The body portion of the carrier-strap 4 curves over the rolling pad, at the front side thereof, as shown, so as to house said pad at that side.

A suitable spring is employed to hold the brake-pad clear from the tire of the wheel. Normally and as shown herein this spring 8 is formed of coils of wire about the respective journals of the strap 4, the ends of the wire taking under the respective clips 6 and the middle portion of the wire between said coils extending across and taking under the strap 4, so as to support it elastically in its elevated position.

The operation of the brake is simple. When the rider wishes to set the brake, he shifts back on the saddle so as to bear upon and depress the operating-plate 1, the first effect of which is to depress the rolling pad 7 into peripheral contact with the tire of the rear wheel, the top of which is rolling forward, as indicated by the arrow in Fig. 5. The tendency of this motion is to carry the rolling pad forward, while the downward pressure of the rod 3 on the free outer end of the strap 4 draws the latter, which is flexible and elastic, about the periphery of the pad 7, thus pressing the latter down upon the tire and at the same time bringing into frictional contact with its periphery more or less of the strap, dependent on the pressure applied. The rolling of the pad 7, which may be of rubber, obviates to a good degree the chafing and abrading action on the tire which is produced by an ordinary brake-shoe, and the effect of the binding action of the flexible strap on the pad is to "brake" it and offer a resistance to its rolling, such resistance being nicely graduated by the pressure brought to bear on the pad.

The end plates or cheeks 4ª on the carrier-strap should be cut free from the body of the said strap as far around their peripheries as possible, so as to leave said body portion free to flex or bend when the brake is being set.

I am aware, of course, that brakes for velocipedes which employ a roller to bear on the tire and a shoe to bear on said roller and press it against the tire are quite common, and this I do not claim, nor do I claim, broadly, operating a brake from the saddle, as this also has been proposed. What I do claim is carefully defined in the claims which follow.

Having thus described my invention, I claim—

1. The combination with the saddle of a velocipede, of a brake-operating plate extending transversely over the rear portion of the saddle and having pendent hinging-lugs whereby it is hinged to the saddle at the respective sides of the latter, a depending brake-rod, hinged to said plate near its rear edge, back of the saddle, a flexible, strap-like, metal carrier, hinged to the frame of the velocipede at its front end above the rear wheel and coupled to the said brake-rod at its rear end, and a roller-pad under said carrier in front of the brake-rod and having bearings in lugs on the latter, which lugs are attached to the carrier at its rear end back of the pad, whereby when a downward pressure is applied to the brake-rod the roller-pad is pressed down upon the wheel and the flexible carrier drawn down over said pad, substantially as set forth.

2. The combination with the saddle of a velocipede, of a brake-operating plate extending transversely over the rear portion of the saddle and having pendent hinging-lugs whereby it is hinged to the saddle at the respective sides of the latter, a depending brake-rod, hinged to said plate near its rear edge back of the saddle, a flexible strap hinged to the frame of the velocipede at one end and coupled to the brake-rod at the other end, a roller-pad under said strap between its ends, said pad being rotatively mounted in lugs on the strap which are connected with the latter at that end of the same where the brake-rod is coupled thereto, whereby when the said rod is depressed the strap will be drawn down on said pad, and a spring which holds said pad elevated and normally out of contact with the wheel, substantially as set forth.

3. A brake adapted for application to the rear wheel of a velocipede, comprising a flexible metal strap 4, means for coupling said strap at its front end to the frame of the velocipede, a depending brake-rod coupled at its lower end to the rear, free end of said strap, the strap having pendent cheeks or lugs 4ª, connected to the strap only at the rear end of the latter, and a roller-pad rotatively mounted in bearings in said lugs forward of the point of attachment of the said brake-rod, whereby a downward pressure on the brake-rod serves to draw the strap down upon and over the roller-pad, substantially as set forth.

4. In a brake for velocipedes, the combination with the strap 4, of flexible sheet metal provided with lugs or pendent parts 4ª at its outer or rear end and hinged at its forward end to clips for attachment to the frame, the said clips, a brake-rod coupled to the outer, rear end of the strap, and a roller-pad 7, rotatively mounted in the lugs 4ª at a point forward of the point of attachment of the brake-rod, whereby the depression of the said rod first puts the roller-pad in contact with the wheel and then puts the pad and strap into frictional contact, substantially as set forth.

In witness whereof I have hereunto signed my name in the presence of two subscribing witnesses.

JEHU C. MOORE.

Witnesses:
PETER A. ROSS,
HENRY CONNETT.